United States Patent
Huang et al.

(10) Patent No.: US 11,352,381 B2
(45) Date of Patent: Jun. 7, 2022

(54) CATALYZED AND GREEN PROCESS OF MALATHION

(71) Applicant: Cheminova A/S, Philadelphia, PA (US)

(72) Inventors: David Huang, Shanghai (CN); Bolin Fan, Shanghai (CN); Kevin Luo, Shanghai (CN)

(73) Assignee: CHEMINOVA A/S, Ronland (DK)

( * ) Notice: Subject to any disclaimer, the term of this patent is extended or adjusted under 35 U.S.C. 154(b) by 0 days.

(21) Appl. No.: 17/280,723

(22) PCT Filed: Sep. 26, 2019

(86) PCT No.: PCT/EP2019/025318
§ 371 (c)(1),
(2) Date: Mar. 26, 2021

(87) PCT Pub. No.: WO2020/064149
PCT Pub. Date: Apr. 2, 2020

(65) Prior Publication Data
US 2022/0002326 A1    Jan. 6, 2022

Related U.S. Application Data

(60) Provisional application No. 62/737,151, filed on Sep. 27, 2018.

(51) Int. Cl.
*C07F 9/17* (2006.01)
*B01J 31/02* (2006.01)

(52) U.S. Cl.
CPC .............. *C07F 9/17* (2013.01); *B01J 31/0229* (2013.01); *B01J 31/0231* (2013.01)

(58) Field of Classification Search
None
See application file for complete search history.

(56) References Cited

U.S. PATENT DOCUMENTS 7,560,445 B2 * 7/2009 Gutman ................ C07F 9/1651
514/127

FOREIGN PATENT DOCUMENTS

| CN | 102336781 | 2/2012 |
| WO | 2007/005988 | 1/2007 |
| WO | 2009/007998 | 1/2009 |

OTHER PUBLICATIONS

International Search Report of corresponding PCT/EP2019/025318 dated Mar. 26, 2021.

* cited by examiner

*Primary Examiner* — Joseph R Kosack
(74) *Attorney, Agent, or Firm* — Cheminova A/S

(57) ABSTRACT

The present invention relates to an improved synthesis of malathion. The presence of an acid facilitates the reaction between O,O-dimethyldithiophosphoric acid (O,O-DMDTPA) and maleate and leads to excellent product yield in shorter reaction time with fewer impurities.

22 Claims, No Drawings

CATALYZED AND GREEN PROCESS OF MALATHION

FIELD OF THE INVENTION

The present invention relates to a novel synthesis of malathion using an acid as a catalyst. Due to the shorter reaction time and lower level of impurities, the synthesis described herein significantly reduces undesirable environmental impact than conventional methods.

BACKGROUND OF THE INVENTION

Various processes for the preparation and/or purification of Malathion have been disclosed in the literature. Malathion (CAS Number: 121-75-5) is an organophosphate insecticide that inhibits cholinesterase activity in vivo. However, the efficient and economical production of Malathion remains a challenge. For instance, numerous impurities are found in Malathion preparation. Some of these impurities are formed during storage and some are generated during the manufacturing process. Many of these Malathion impurities have been found to be toxic. O,O,S-trimethyl phosphorodithioate (MeOOSPS) and O,S,S-trimethyl phosphorothioate (MeOSSPO) can cause liver damage. Malathion physical properties make it difficult to remove impurities by conventional means for example, because Malathion is liquid at ambient temperature (melting point: 2.9° C.), and crystallization is difficult.

Therefore, a need exists for an improved process for the preparation of Malathion.

SUMMARY OF THE INVENTION

The present invention provides a novel approach for the production of Malathion with good yields and significantly reduced impurities.

Malathion produced by this method has significantly lower levels of toxic impurities and storage stable, when compared to the any other commercial method available in literature for the pharmaceutical use.

The method generally includes reacting O,O-dimethyldithiophosphoric acid (O,O-DMDTPA) with diethyl maleate in the presence of an acid.

In some embodiments, the method includes prior to reacting O,O-dimethyldithiophosphoric acid (O,O-DMDTPA) with maleate, (a) mixing O,O-dimethyldithiophosphoric acid (O,O-DMDTPA) with an acid to form a mixture and (b) adding diethyl maleate to the mixture. In some embodiments, the temperature of step (a) is controlled at about 5 to about 20° C. In some embodiments, the temperature of step (b) is controlled at between about 10 and about 25° C. In some embodiments, the temperature is controlled at between about 20 and about 50° C. after completing the addition of the diethyl maleate to the mixture. In some embodiments, the temperature is controlled at between about 35 and about 45° C. after completing the addition of the diethyl maleate to the mixture.

In some embodiments, the acid ranges from about 0.1% to about 20% in the mixture of step (a) by weight. In some embodiments, the acid ranges from about 1% to about 10% in the mixture of step (a) by weight.

In some embodiments, the acid comprises hydrochloric acid. In some embodiments, the acid comprises hydrochloric acid having a concentration ranging from about 20% to about 37% by weight. In some embodiments, the acid consists essentially of saturated hydrochloric acid.

In some embodiments, the molar ratio between the O,O-DMDTPA and the diethyl maleate ranges from about 1:1.2 In some embodiments, to about 1:1. In some embodiments, the molar ratio ranges from about 1:1.1 to about 1:1.02. In some embodiments, the diethyl maleate starts to react with the O,O-DMDTPA upon being added to the mixture.

In some embodiments, the reaction between diethyl maleate and O,O-DMDTPA is allowed to continue for a period of less than about 10 hours. In some embodiments, the reaction is allowed to continue for a period of less than about 8 hours.

In some embodiments, the method further includes following step (b) a step (c) washing the resultant mixture of step (b) with an aqueous solution to isolate malathion. In some embodiments, step (c) includes removing side products by Wiped-Film Stills (WFS).

In some embodiments, the isolated malathion contains an impurity comprising less than about 0.55% of O,O-DMDTPA by weight. In some embodiments, the isolated malathion contains an impurity comprising less than about 0.35% of O,O-DMDTPA by weight.

In some embodiments, the yield of the malathion is more than about 90%. In some embodiments, the yield of the malathion reaches more than about 90% in a period of less than about 7 hours.

DETAILED DESCRIPTION OF THE INVENTION

The present invention relates to an improved process for the preparation of malathion. In comparison with conventional approaches, the method described herein achieves a higher yield production of malathion in a shorter period of time. Further, due to the reduced amount of impurities, the stability of malathion is also improved.

While the following text may reference or exemplify specific components of a reaction or a condition of the reaction, it is not intended to limit the scope of the invention to such particular references or examples. Various modifications may be made by those skilled in the art, in view of practical and economic considerations, such as the amount of a reactant and the temperature and length of a reaction.

The articles "a" and "an" as used herein refers to "one or more" or "at least one," unless otherwise indicated. That is, reference to any element or component of the present invention by the indefinite article "a" or "an" does not exclude the possibility that more than one element or component is present.

The term "about" as used herein refers to the referenced numeric indication plus or minus 10% of that referenced numeric indication.

The method generally includes reacting O,O-dimethyldithiophosphoric acid (O,O-DMDTPA) with maleate in the presence of an acid. The acid thus serves as a catalyst not only for improved yield in shorter reaction time but also for reduced impurities. Such an efficient approach is also environmentally friendly at a lower production cost. The initial mixing of the reactants can be controlled at a temperature of, for example, below about 25, below about 20 or below about 15° C. After all the reactants are mixed, the temperature can be raised to, for example, between about 20 and about 50° C., between about 35 and about 45° C., and between about 35 and about 40° C. In some embodiments, the overall reaction time is generally less than about 15 hours, less than about 12 hours, less than about 10 hours, less than about 8 hours, less than about 7 hours, less than about 6 hours, or less than about 5 hours.

In some embodiments, the method includes mixing O,O-dimethyldithiophosphoric acid (O,O-DMDTPA) with an acid to form a mixture; adding diethyl maleate to the mixture. Diethyl maleate can be added in portions to the mixture at a controlled temperature to minimize the formation of side products yet without compromising the efficiency of the reaction. For example, diethyl maleate can be added dropwise to the mixture at a temperature of between 10 and 25° C., between 15 and 20° C., or between 1 and 20° C. The rate of the addition and the temperature should be adjusted so that the reaction can proceed without excessive build-up of unreacted diethyl maleate.

After the addition of diethyl maleate, the reaction mixture can be warmed up to a temperature of about 50, about 45, about 40, or about 35° C. The reaction is allowed to continue for an additional period of from about 3 to about 12 hours, from about 5 to about 12 hours, from about 3 to about 10 hours, from about 4 to about 6 hours, from about 5 to about 10 hours, from about 6 to about 8 hours, or from about 6 to about 7 hours. In some embodiments, the temperature can be raised in stages, for example, first to about 20 or about 25° C. before maintaining at about 40° C.

The amount of the acid ranges from about 0.1% to about 20% in the mixture of step (a) by weight. In some embodiments, the acid in the mixture ranges from about 0.5% to about 10%, from about 1% to about 10%, from about 3% to about 10%, from about 5% to about 10%, from about 3% to about 8%, or from about 4% to about 8%.

The acid can be, for example, hydrochloric acid, hydrobromic acid, sulfuric acid, phosphoric acid, acetic acid, trifluoro-acetic acid, or any combination thereof. In some embodiments, the acid is hydrochloric acid having a concentration of about 20%, about 25%, about 30%, or about 35% by weight. In some embodiments, the acid is saturated hydrochloric acid. In some embodiments, the acid is hydrochloride gas, which is introduced to the mixture by for example bubbling. In some embodiments, the acid consists essentially of saturated hydrochloric acid. Before the addition of diethyl maleate, the mixture can be cooled to a temperature, for example, between about 10 and about 20° C. or between about 10 and about 15° C.

To ensure the complete reaction of O,O-DMDTPA, the molar ratio between the O,O-DMDTPA and the diethyl maleate can be controlled at for example from about 1:1.2 to about 1:1. In some embodiments, the molar ratio between the O,O-DMDTPA and the diethyl maleate ranges from about 1:1.1 to about 1:1.01, from about 1:1.05 to about 1:1.01, or 1:1.03 to about 1:1.01.

Isolating the product includes removing impurities and/or purifying malathion. For example, in order to reduce the levels of impurities, the malathion prepared by the above process may be subject to washing with water or an aqueous solution. In some embodiments, the crude product is treated with a sulfur solution. In some embodiment, a sulfur solution with a pH of less than about 7 is effective to eliminate dimer impurity formation. The pH of the sulfur solution ranges from about 6.0 to about 7.0. In some embodiments, malathion is crystallized with a suitable solvent such as methanol to improve the purity.

The organic phase contains the malathion product. Additional organic solvent can be used if needed. The organic phase can be subject to distillation for removing some impurities including MP-1-S (Phosphonothioic acid, O,O-dimethyl ester), MOOOPS (Phosphorothioic acid, O,O,O-trimethyl ester), ME (Diethyl Maleate), FE (Diethyl fumarate), MOSSPO and MOOSPS (Phosphorodithioic acid, O,O,S-trimethyl ester). In some embodiments, wiped-film stills (WFS) is applied to remove impurities.

The malathion obtained by the present invention has much less impurities than conventional methods. In some embodiments, the O,O-DMDTPA impurity is less than about 0.65%, less than about 0.55%, less than about 0.5%, less than about 0.45%, less than about 0.4%, less than about 0.35%, less than about 0.3%, less than about 0.25%, less than about 0.15%, or less than about 0.1% by weight.

The method of the present invention achieves a yield of malathion much higher than previously reported methods. In some embodiment, the yield is more than about 80%, more than about 85%, more than about 90%, or more than about 95%.

Because diethyl maleate is insoluble in aqueous phase, mixing of reactants is necessary to promote the reaction. For example, mechanical shaking, stirring or any type of agitation can be applied to facilitate the mixing of the reactants. In some embodiments, an inert organic solvent can be added to the reaction mixture to facilitate the mixing of the reactants.

EXAMPLES

A green process of the preparation of malathion

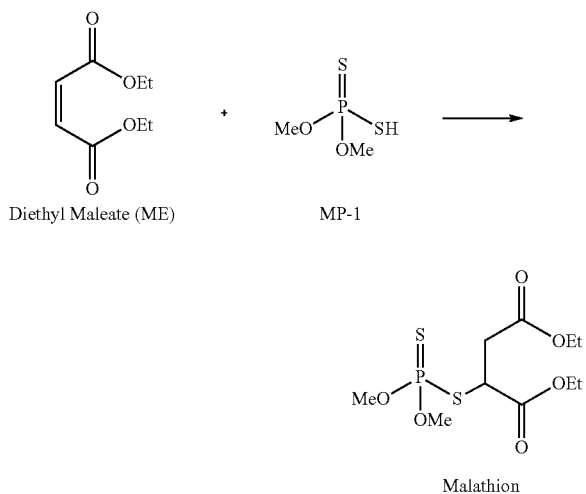 [SMILES: CCOC(=O)/C=C\C(=O)OCC ; COP(=S)(S)OC ; CCOC(=O)CC(SP(=S)(OC)OC)C(=O)OCC]

Diethyl Maleate (ME)     MP-1

Malathion

MP-1 (45.1 g) and concentrated HCl acid (2.5 g) were weighed out, and in sequence added to a 0.5 L Jacketed reactor. The temperature was adjusted to 10-15° C. Diethyl maleate (50.0 g) was added dropwise, while keeping the temperature between 15 and 20° C., it is important to ensure that reaction take place from beginning of dosing. After the addition, the reaction was controlled at 20° C. for 1.0 h under constant agitation. The temperature was then increased to 40° C. and maintained for 7 hours. A sample was taken and checked for conversion GC-FID (MP-1≤0.5 A %) periodically. After the conversion was determined acceptable, the temperature was turned to 30° C. and water was added (25.0 g). The organic phase was subject to WFS distillation for removing some impurities of MP-1-S, MOOOPS, ME, FE, MOSSPO and MOOSPS. The yield of malathion was 87.2 g (98% wt).

The effect of hydrochloric acid on the reaction is summarized below.

| Batch NO | Catalyst | IPC(h) | Analysis A % | | | | |
| --- | --- | --- | --- | --- | --- | --- | --- |
| | | | MP-1-S | MOOOPS | MP-1 | FE | Malathion |
| 1 | No | 5 | 0.28 | 0.23 | 2.00 | 16.70 | 77.89 |
| | | 10 | 0.28 | 0.22 | 1.37 | 12.68 | 82.59 |
| 2 | 36% HCl | 5 | 0.33 | 0.25 | 0.54 | 7.01 | 88.90 |
| | | 10 | 0.34 | 0.25 | 0.30 | 6.37 | 89.75 |
| 3 | HCl gas | 5 | 0.32 | 0.26 | 0.20 | 5.47 | 90.18 |
| 4 | 98% $H_2SO_4$ | 5 | 0.28 | 0.22 | 0.93 | 9.61 | 84.90 |
| | | 10 | 0.29 | 0.31 | 0.62 | 8.38 | 85.50 |

* "A %" refers to area percentage; the catalysts of 36% HCl and 98% $H_2SO_4$ are used in the amount of 5% based on the weight of diethyl maleate, and the HCl gas is added up to saturated; "IPC" refers to in process control.

It will be understood by those of skill in the art that numerous and various modifications can be made without departing from the spirit of the present invention. Therefore, it should be understood that the various embodiments of the present invention described herein are illustrative only and not intended to limit the scope of the present invention.

The invention claimed is:

1. A method of producing malathion, comprising reacting O,O-dimethyldithiophosphoric acid (O,O-DMDTPA) with diethyl maleate in the presence of an acid.

2. The method of claim 1, further comprising, prior to reacting the O,O-dimethyldithiophosphoric acid (O,O-DMDTPA) with the maleate,
   (a) mixing the O,O-dimethyldithiophosphoric acid (O,O-DMDTPA) with the acid to form a mixture; and
   (b) adding the diethyl maleate to the mixture.

3. The method of claim 2, wherein the temperature of step (a) is controlled at between about 5 and about 20° C.

4. The method of claim 2, wherein the temperature of step (b) is controlled at between about 10 and about 25° C.

5. The method of claim 2, wherein the temperature is controlled at between about 20 and about 50° C. after completing the addition of the diethyl maleate to the mixture.

6. The method of claim 2, wherein the temperature is controlled at between about 35 and about 45° C. after completing the addition of the diethyl maleate to the mixture.

7. The method of claim 1, wherein the acid ranges from about 0.1% to about 20% in the mixture of step (a) by weight.

8. The method of claim 1, wherein the acid ranges from about 1% to about 10% in the mixture of step (a) by weight.

9. The method of claim 1, wherein the acid is hydrochloric acid or sulfuric acid.

10. The method of claim 1, wherein the acid is hydrochloric acid having a concentration ranging from about 20% to about 37% by weight, or sulfuric acid having a concentration ranging from about 70% to about 98% by weight.

11. The method of claim 1, wherein the acid consists essentially of saturated hydrochloric acid.

12. The method of claim 1, wherein the molar ratio between the O,O-DMDTPA and the diethyl maleate ranges from about 1:1.2 to about 1:1.

13. The method of claim 1, wherein the molar ratio between the O,O-DMDTPA and the diethyl maleate ranges from about 1:1.1 to about 1:1.02.

14. The method of claim 1, wherein the diethyl maleate starts to react with the O,O-DMDTPA upon contact with each other.

15. The method of claim 1, wherein the reaction between diethyl maleate and O,O-DMDTPA is allowed to continue for a period of less than about 10 hours.

16. The method of claim 1, wherein the reaction between diethyl maleate and O,O-DMDTPA is allowed to continue for a period of less than about 8 hours.

17. The method of claim 1, further comprising after the reaction washing with water or an aqueous solution.

18. The method of claim 1, further comprising after the reaction removing side products by Wiped-Film Stills (WFS).

19. The method of claim 1, further comprising isolating the malathion, wherein the isolated malathion contains an impurity comprising less than about 0.55% of O,O-DMDTPA by weight.

20. The method of claim 1, further comprising isolating the malathion, wherein the isolated malathion contains an impurity comprising less than about 0.35% of O,O-DMDTPA by weight.

21. The method of claim 1, wherein the yield of the malathion is more than about 90%.

22. The method of claim 1, wherein the yield of the malathion reaches more than about 90% in a period of less than about 7 hours.

* * * * *